United States Patent
Loiwal et al.

(10) Patent No.: US 8,972,411 B1
(45) Date of Patent: Mar. 3, 2015

(54) SELECTION OF SPONSORED CONTENT USING MULTIPLE SETS OF QUERY TERMS

(75) Inventors: Navneet Loiwal, Sunnyvale, CA (US); James McFadden, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1145 days.

(21) Appl. No.: 12/360,735

(22) Filed: Jan. 27, 2009

(51) Int. Cl.
   *G06F 17/30* (2006.01)

(52) U.S. Cl.
   CPC .................. *G06F 17/3053* (2013.01)
   USPC ...... 707/748; 707/769; 705/14.49; 705/14.54

(58) Field of Classification Search
   CPC .................................................. G06F 17/3028
   USPC ..................... 707/748, 769; 705/14.49, 14.54
   See application file for complete search history.

(56) References Cited

U.S. PATENT DOCUMENTS

| | | | |
|---|---|---|---|
| 7,136,875 B2 | 11/2006 | Anderson et al. | |
| 7,346,606 B2 | 3/2008 | Bharat | |
| 7,849,080 B2* | 12/2010 | Chang et al. | 707/723 |
| 2005/0071224 A1* | 3/2005 | Fikes et al. | 705/14 |
| 2005/0071325 A1* | 3/2005 | Bem | 707/3 |
| 2005/0086215 A1* | 4/2005 | Perisic | 707/3 |
| 2005/0131758 A1* | 6/2005 | Desikan et al. | 705/14 |
| 2007/0239713 A1* | 10/2007 | Leblang et al. | 707/6 |
| 2008/0091633 A1* | 4/2008 | Rappaport et al. | 706/50 |
| 2008/0177728 A1* | 7/2008 | Bowman et al. | 707/5 |
| 2009/0287672 A1* | 11/2009 | Chakrabarti et al. | 707/5 |
| 2009/0327265 A1* | 12/2009 | Wang et al. | 707/5 |
| 2010/0010895 A1* | 1/2010 | Gabrilovich et al. | 705/14.54 |

* cited by examiner

*Primary Examiner* — Shew-Fen Lin
(74) *Attorney, Agent, or Firm* — Fish & Richardson P.C.

(57) ABSTRACT

Multiple sets of words and phrases can be used as query terms for accessing sponsored content. Sponsored content is associated with item terms. The query terms are matched with the item terms. The result of the matching operation is a numerical score for each item of sponsored content that can be used to select sponsored content. Conditions present across the set of matched terms are detected. Such conditions can include the occurrence of a matched query term in multiple sets of query terms. This condition can be addressed by determining a number of unique matching query terms across all sets of query terms. The score given to an item of sponsored content can be adjusted if such a condition occurs. For example, the score could be adjusted according to a function of the number of unique matching query terms across all sets of query terms. If the number of matching query terms across all sets of query terms is low, such as one or two, then the function can define a penalty to be applied to the score given to the item of sponsored content. If the number of matching query terms across all sets of query terms is higher, such as three or more, then the function can define an adjustment to be applied to the score given to the item of sponsored content.

18 Claims, 4 Drawing Sheets

| QUERY TERM | DOCUMENT TERMS | SYNONYMS | URL TERMS | QUERIES | CATEGORY TERMS | OTHER SET(S) |
|---|---|---|---|---|---|---|
| RED | 314 ✓ | | | ✓ | ✓ | |
| CAR | | ✓ | ✓ | | ✓ | |
| A | ✓ | | | | ✓ | ✓ |
| B | ✓ | ✓ | | | | |

SELECTION OF SPONSORED CONTENT USING MULTIPLE SETS OF QUERY TERMS

TECHNICAL FIELD

This invention relates generally to content identification.

BACKGROUND

Sponsored content (e.g., advertisements) can be included in a resource that is distributed on the Internet. Such sponsored content can be stored in a repository and can be associated with words and phrases, which are referred to herein as "item terms." A selection engine can be used to determine which sponsored content to provide to a resource. A conventional selection engine receives a set of keywords, a resource identifier such as a uniform resource locator (URL) or other information (hereinafter just "query terms") as an input. The selection engine in turn selects sponsored content from the repository that matches the provided query terms.

The query terms used to select sponsored content may come from a variety of sources. In some implementations, the query terms are derived from a target resource (e.g., document), which will ultimately be modified to contain the sponsored content. Content of the target resource can be analyzed to identify one or more words or phrases. Such words or phrases can be further processed to generate a set of related words or phrases, such as synonyms. Other information associated with the resource, such as a uniform resource locator (URL) or other information, also can be processed to generate another set of words or phrases. Other words that can be used as query terms include histories of queries that have been used to access the resource. A resource also can have words defining a category to which the resource belongs. These multiple sets of words and phrases can be used as query terms for accessing sponsored content.

The selection engine can apply a matching operation between the sets of query terms and the item terms associated with sponsored content in the repository to select a sponsored content item. The result of the matching operation for an item of sponsored content can be information describing the query terms which matched item terms of the item of sponsored content, and the set of query terms in which the matching query terms reside. From this information, a numerical score for the item of sponsored content can be generated and used to select items of sponsored content for inclusion with a given resource.

SUMMARY

When using multiple sets of query terms to select sponsored content, it is a challenge to design a scoring process that prevents an inappropriately high score from being given to an item of sponsored content. A score for an item of sponsored content can be inappropriately high, for example, when a matching query term contributes to the score multiple times because it is in multiple sets. Such conditions can be detected and the score for an item of sponsored content can be adjusted accordingly.

Methods, systems, apparatus and computer program products are provided for detecting conditions present across multiple sets of matched terms. Such conditions can include the occurrence of a matched query term in multiple sets of query terms. This condition can be addressed by determining a number of unique matching query terms across all sets of query terms. The score given to an item of sponsored content can be adjusted if such a condition occurs. For example, the score could be adjusted according to a function of the number of unique matching query terms across all sets of query terms. If the number of matching query terms across all sets of query terms is low, such as one or two, then the function can define a penalty to be applied to the score given to the item of sponsored content. If the number of matching query terms across all sets of query terms is higher, such as three or more, then the function can define an adjustment to be applied to the score given to the item of sponsored content. As a result, better quality selections of sponsored content to a resource may be achieved.

Accordingly, in one aspect, a machine-implemented method includes receiving into a memory of a computer system, data representing a plurality of query terms. With the computer system, an electronic database is accessed. The electronic database includes computer readable storage that stores data representing items of sponsored content, wherein each item of sponsored content has associated item terms, and the computer readable storage further stores data representing the item terms associated with the sponsored content. Using a processor in the computer system, items of sponsored content are identified in the electronic database having one or more item terms that match one or more of the plurality of query terms in the memory. Using the processor in the computer system, for each of the identified items of sponsored content, a score is formulated for the item according to matches between the item terms for the item and the query terms. A matching condition among the matches between the item terms for the item and the query terms, across the set of query terms, is detected, and the score for the item is adjusted if the matching condition is detected.

In another aspect, a computer program product includes a computer readable medium with computer program instructions encoded on the computer readable medium that, when processed by a computer, instruct the computer to perform a process. The process includes receiving a plurality of query terms. A database of items of sponsored content is accessed, wherein each item of sponsored content has associated item terms.

In the database, items of sponsored content having one or more item terms that match one or more of the plurality of query terms are identified. For each of the identified items of sponsored content, a score is formulated for the item according to matches between the item terms for the item and the query terms. A matching condition is detected among the matches between the item terms for the item and the query terms, across the set of query terms. The score for the item is adjusted if the matching condition is detected.

The matching condition can include the occurrence of a matched query term in multiple sets of query terms. This condition can be addressed by determining a number of unique matching query terms across all sets of query terms. The score may be adjusted using a function of this number of unique matching query terms. Further, if the number of matching query terms across all sets of query terms is low, such as one or two, then a function can define a penalty to be applied to the score given to the item of sponsored content. If the number of matching query terms across all sets of query terms is higher, such as three or more, then a function can define an increase to be applied to the score given to the item of sponsored content.

Various aspects may be embodied in processes performed by data processing equipment, as a tangible computer readable medium encoded with computer program instructions

DETAILED DESCRIPTION

Figure 1:
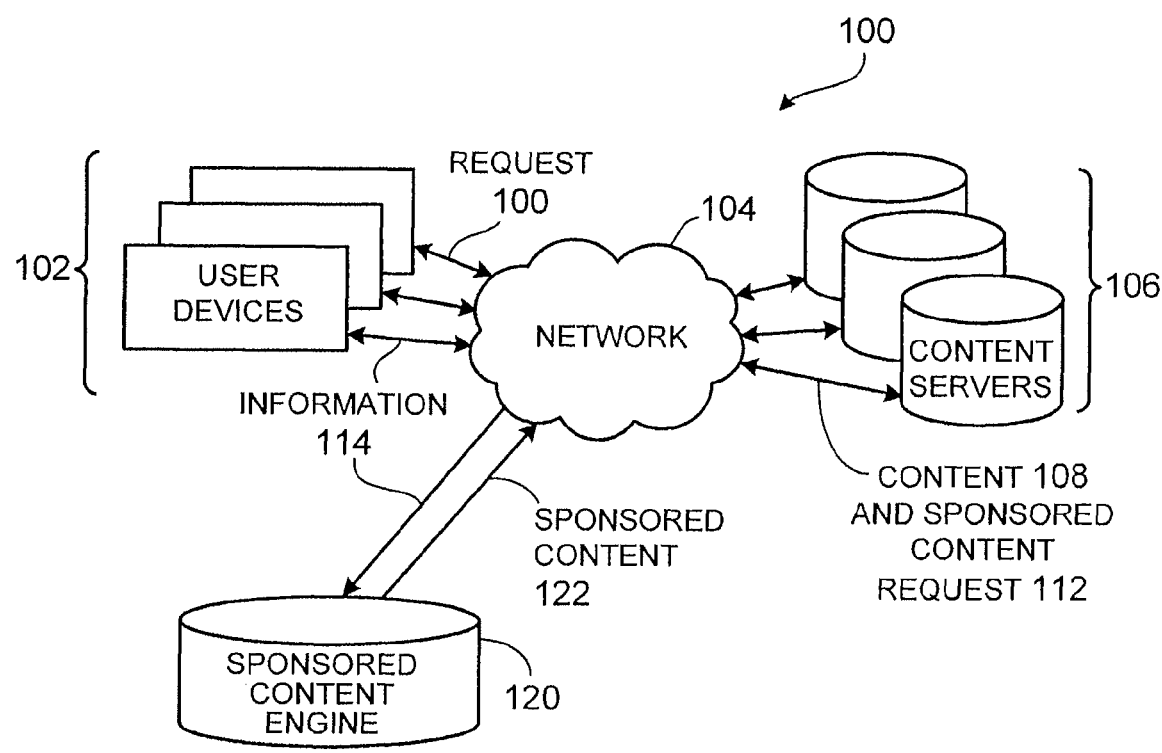
FIG. 1 is a block diagram of an example system for providing sponsored content.

FIG. 1 is a block diagram of an example advertising system 100. This advertising system operates over a computer network 104, such as the Internet, and includes a plurality of user devices (e.g., computers 102), each of which connect to the network 104. Such user devices 102 can be for example, a personal computer, a business desktop computer, a handheld computer or mobile communication device or other devices enabling content retrieval and viewing. Such devices typically include browser software (not shown) that is run on the device to provide a user with the ability to access and view resources, e.g., documents, on the network 104. While reference is made to advertising, other forms of content can be distributed by advertising system 100 including other forms of sponsored content.

A plurality of content servers 106, each typically associated with one or more content sources, also are connected to the network 104. A user device 102 can send a request 100 to a content server 106, requesting content 108. A content server 106 provides content 108 to the user devices 102 over the network 104 in response to such requests 100. The content 108 can include sponsored content, such as an advertisement, to be displayed along with content 108. For example, the sponsored content may be represented by a request 112 embedded in the content 108, which may be used to request another source to provide the sponsored content. The content servers 106 can be of the form of computers that typically include web server software that provides the ability to serve up content to other computers in response to requests received over the network 104. Multiple different content servers 106 can provide content (e.g., page content or advertising) to the requesting device.

In some implementations, when the user device 102 processes the content 108, it also identifies the advertisement request 112 and sends information 114 derived from the advertisement request to an advertisement engine 120. This information 114 may include query terms from which the advertisement engine 120 may select an advertisement 122 to provide to the user device 102. The selected advertisement 122 is received by the user device 102 and displayed with the content 108 to a user.

The transmission and content of the advertisement request 112 and the advertisement 122 can be implemented in many ways. Although FIG. 1 illustrates the request 112 being transmitted by the user device 102 to the advertisement engine 120, the request 112 also could be sent directly to the advertisement engine from the content server 106. The advertisement could be sent to the content server 106 instead of the user device 102. The request 112 may include a set of query terms or it could include information from which such query terms can be derived.

Figures 2, 3:
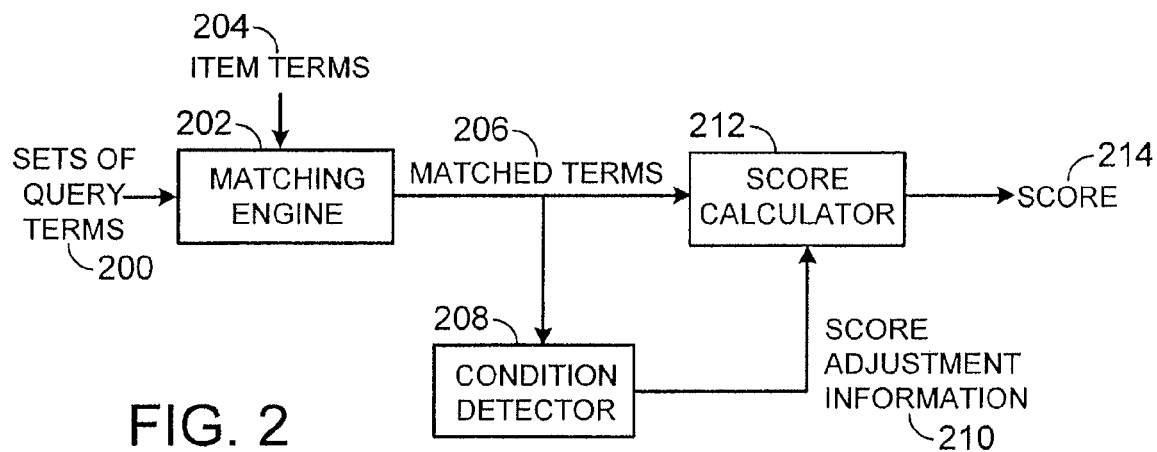
FIG. 2 is a block diagram of an example system for scoring items of sponsored content.
FIG. 3 illustrates how matches between multiple sets of query temms and item terms can be processed to provide a score for an item of sponsored content.

How the sponsored content selection engine 120 selects sponsored content can be implemented in many ways. Referring now to FIG. 2, sets 200 of query terms, and item terms 204 for each item of sponsored content, are inputs to a matching engine 202.

The query terms 200 used to select sponsored content may come from a variety of sources. In some implementations, the query terms are derived from a target resource (e.g., document), which will ultimately be modified to contain the sponsored content. Content of the target resource can be analyzed to identify one or more key words or phrases. Such words or phrases can be further processed to generate a set of related words or phrases, such as synonyms. Other information associated with the resource, such as a uniform resource locator (URL) or other information, also can be processed to generate another set of words or phrases. Other words that can be used as query terms include histories of queries that have been used to access the resource. A resource also can have words defining a category to which the resource belongs. These multiple sets of words and phrases can be used as query terms 200 for accessing sponsored content.

The matching engine 202 determines, for each item of sponsored content, the item terms that match the query terms, thus providing a set of matched terms 206. The matching engine can apply a matching operation between the sets of query terms and the item terms associated with sponsored content in the repository to select a sponsored content item. The result of the matching operation for an item of sponsored content can be information (the set of matched terms 206) describing the query terms which matched item terms of the item of sponsored content, and the set of query terms in which the matching query terms reside.

From this information, a numerical score for the item of sponsored content can be generated and used to rank and to select items of sponsored content for inclusion with a given resource. The set of matched terms 206 is input to and analyzed by a condition detector 208, which provides as an output score adjustment information 210. The set of matched terms also is input to a score calculator 212. The score calculator also receives as an input the score adjustment information 210 output by the condition detector 208. The score calculator 212 determines and outputs a score 214.

FIG. 3 illustrates how matches between multiple sets of query terms and item terms can be processed to provide a score for an item of sponsored content. In FIG. 3, column 300 shows query terms that match item terms associated with an item of sponsored content. In this example, query terms "A", "B", "red" and "car" match item terms. Columns 302, 304, 306, 308, 310 and 312 illustrate example sets of query terms. Each cell, e.g., 314, indicates whether the query term is present in the set of query terms.

In general, a value is determined for each matching query term, e.g. "red", based on the number sets in which the query term resides. This score also can be weighted based on the set(s) in which the query term resides. The values for all the matching terms are then combined. In addition, the number of matching terms within each set are determined. This value for each set also can be weighted based on the set. The values for all the sets are then combined.

A score adjustment for an item of sponsored content is further provided based on conditions detected across the sets of matching terms. Such conditions can include the occurrence of a unique matching query term in multiple sets of query terms. This condition can be addressed by determining the number of matching query terms across all sets (e.g., the number of terms in column 300). In some cases, a score increase is provided when the number of terms is sufficiently high, e.g., three or more, as described in connection with FIGS. 4 and 5 below. In some cases, a score penalty is provided when the number of terms is sufficiently low, e.g., one or two, as described in connection with FIGS. 6 and 7 below. The score given to an item of sponsored content can be adjusted if such conditions occur. The adjustment can be a function of the number of terms.

Figure 4:
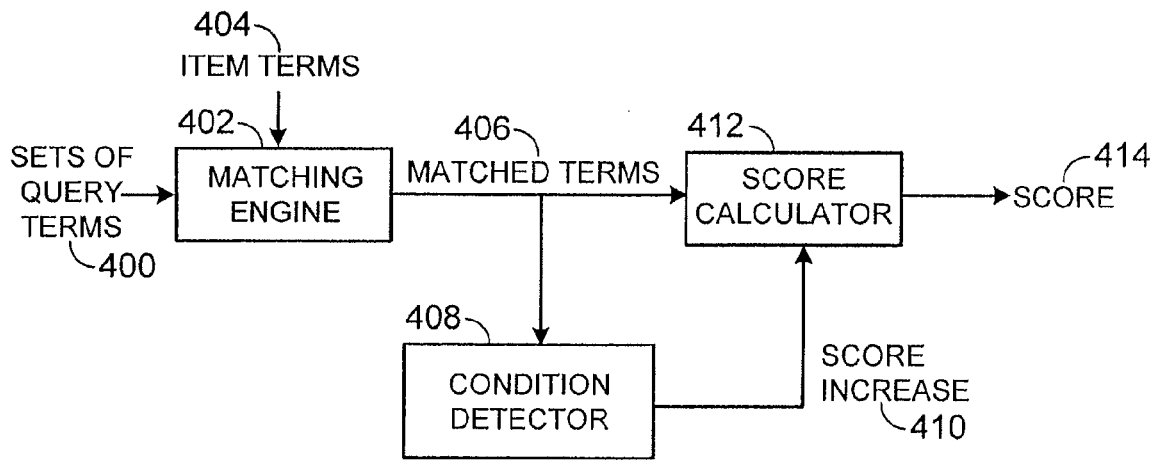
FIG. 4 is a block diagram of an example system for scoring items of sponsored content.

Turning now to FIG. 4, a block diagram of an example system that detects conditions across the sets of query terms and increases the score of an item of sponsored content will now be described. In this example, the condition that is detected is the occurrence of a sufficiently high number of unique, matching query terms across the sets of query terms.

In FIG. 4, the sets 400 of query terms, and item terms 404 for an item of sponsored content, are inputs to a matching engine 402. The matching engine determines, for each item of sponsored content, the item terms that match the query terms, thus providing a set of matched terms 406. The set of matched terms is input to and analyzed by a condition detector 408, which provides as an output a score increase 410. In this instance the condition detector determines whether there is a sufficiently high number of matching terms across all sets of query terms. For example, the detector can determine the number of unique, matched query terms across all sets. The set of matched terms also is input to a score calculator 412. The score calculator also receives as an input the score increase 410 output by the condition detector. The score increase can be, for example, a weighted function of the number of unique matching query terms across the sets of query terms. Using this information, the score calculator determines and outputs a score 414.

Figure 5:
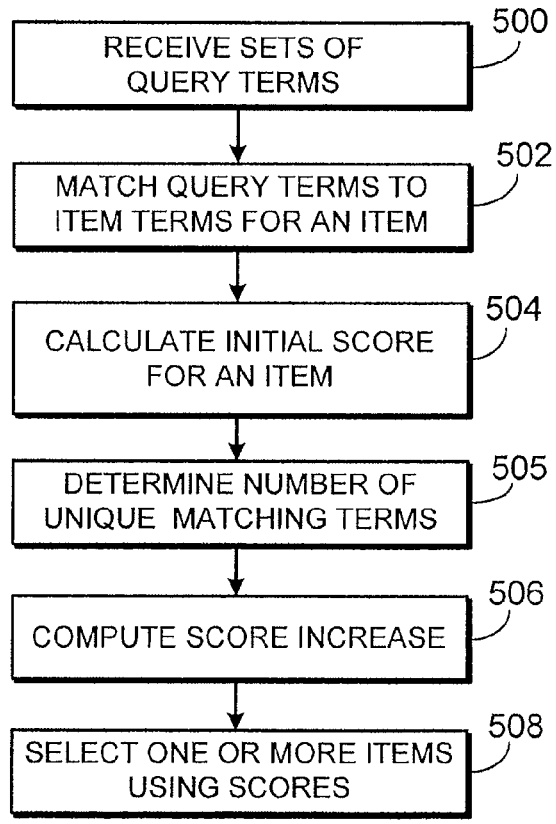
FIG. 5 is a flow chart describing an example process executed by the system of FIG. 4.

An example of a process that can be performed by the system of FIG. 4 will now be described in connection with the flowchart of FIG. 5., which is performed for each item of sponsored content. As a result of a request for sponsored content, sets of query terms are received 500. These sets of query terms are matched 502 to item terms associated with sponsored content in a repository. As a result of this matching, for an item of sponsored content a set of matched terms is provided. Using the set of matched terms for an item, an initial score is calculated 504 for an item. The set of matched terms is analyzed to determine 505 if the number of unique, matching query terms across all sets is sufficiently high, e.g., three or more. If yes, a score increase can be computed 506, and the initial score is updated. The score increase may be any function of the number of unique, matched query terms, for which the result has a sign the same as a sign of a good score for an item of sponsored content. Steps 502 through 506 are performed for each item. The scores for various items then can be used to select 508 one or more items of sponsored content to provide in response to the request for sponsored content.

Figure 6:
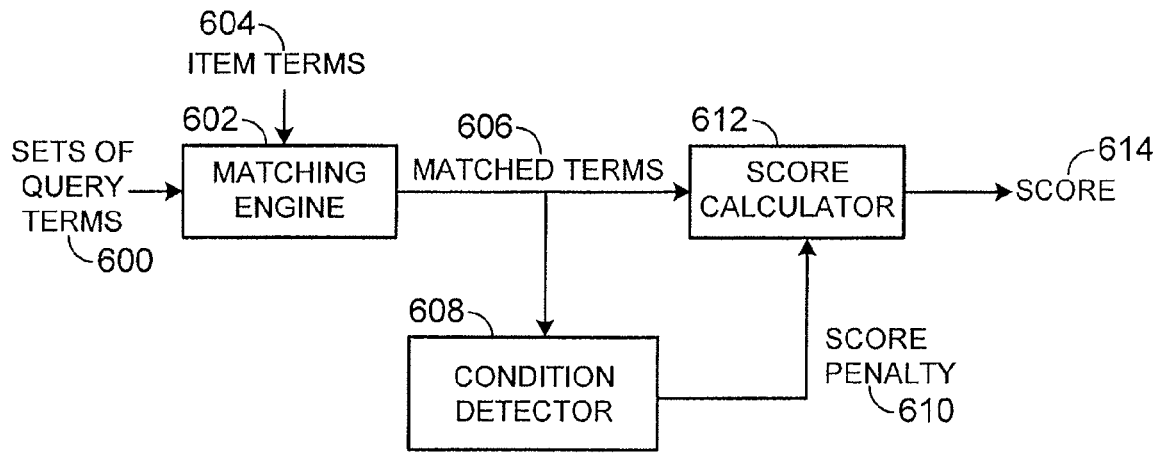
FIG. 6 is a block diagram describing another example system for scoring items of sponsored content.

Turning now to FIG. 6, a block diagram of an example system that detects conditions across the sets of query terms and penalizes the scores of items of sponsored content will now be described. In this example, the condition that is detected is the occurrence of a low number of unique, matching query terms across the sets of matching terms.

In FIG. 6, the sets 600 of query terms, and item terms 604 for each item of sponsored content, are inputs to a matching engine 602. The matching engine determines, for each item of sponsored content, the item terms that match the query terms, thus providing a set of matched terms 606. The set of matched terms is input to and analyzed by a condition detector 608, which provides as an output a score penalty 610. In this instance the condition detector determines if the number of unique, matched query terms is low, such as one or two. For example, the detector can determine the number of unique, matched query terms across all sets. The set of matched terms also is input to a score calculator 612. The score calculator also receives as an input the score penalty 610 output by the condition detector. The score calculator determines and outputs a score 614.

Figure 7:
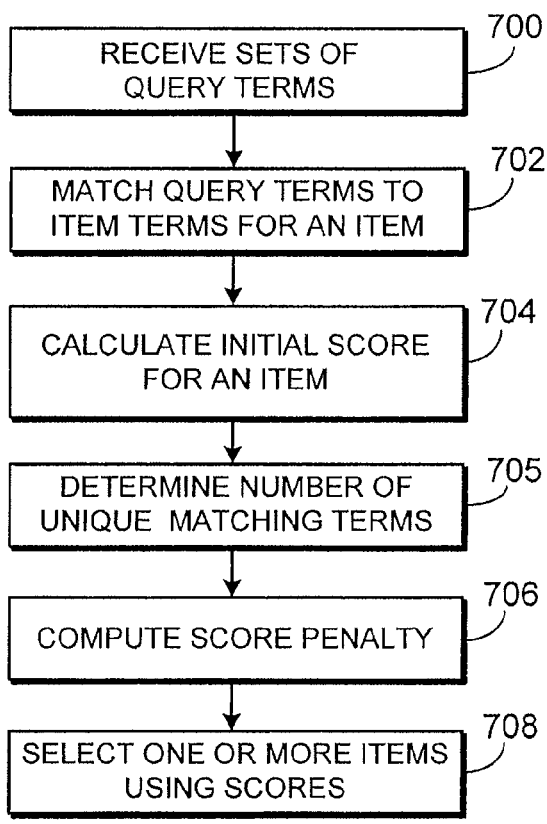
FIG. 7 is a flow chart describing an example process executed by the system of FIG. 6.

An example of a process that can be performed by the system of FIG. 6 will now be described in connection with the flowchart of FIG. 7. As a result of a request for sponsored content, sets of query terms are received 700. These sets of query terms are matched 702 to item terms associated with sponsored content in a repository. As a result of this matching, for an item of sponsored content, a set of matched terms is provided. Using the set of matched terms for an item, an initial score is calculated 704 for an item. The set of matched terms is analyzed to determine 705 if the number of unique, matched terms is sufficiently low, e.g., one or two. If yes, a score penalty can be computed 706. Using the score penalty, the initial score is updated for an item. The score penalty may be any function of the number of unique, matched query terms, for which the result has a sign opposite a sign of a good score for an item of sponsored content. Steps 702 through 706 are performed for each item. The scores for various items are then used to select 708 one or more items of sponsored content to provide in response to the request for sponsored content.

Other conditions that apply across multiple sets also could be detected in addition to or instead f the foregoing. The score adjustments for various detected conditions can be combined.

The techniques described above can be implemented in digital electronic circuitry, or in computer hardware, firmware, software, or in combinations of them. The techniques can be implemented as a computer program product, i.e., a computer program encoded on a tangible computer readable medium, e.g., a memory device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Computer readable media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The computing system can include clients and servers. A client and server are generally remote from each other and typically interact over a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A machine-implemented method comprising:
   receiving into a memory of a computer system, data representing a plurality of query terms arranged in a plurality of sets of query terms;
   accessing, with the computer system, an electronic database including computer readable storage that stores data representing items of sponsored content, wherein each item of sponsored content has associated a plurality of item terms, and the computer readable storage further stores data representing the plurality of item terms associated with the sponsored content;
   using one or more processors in the computer system, for each of the items of sponsored content:
      identifying a set of matched query terms using a matching operation between the plurality of query terms and the plurality of item terms associated with the item of sponsored content, wherein each of the plurality of sets of query terms comprises at least one query term that matches at least one item term of the plurality of item terms associated with the item of sponsored content;
      formulating a score for the item of sponsored content according to the set of matched query terms, wherein a value for each of the matched query terms is determined based on a number of sets in which the each of the matched query terms resides, weighted based on a set in which the each of the matched query terms resides, and the score of the item is determined by combining values for all the matched query terms;
      identifying, from the identified matched query terms for the item of sponsored content, one or more unique query terms that are included in (i) the identified set of matched query terms and (ii) more than one set of the plurality of sets of query terms;
      determining a number of the one or more unique query terms across sets of the plurality of sets of query terms;
      adjusting the score for the item of sponsored content as a function of the determined number of the one or more unique query terms; and
      assigning the adjusted score to the item of sponsored content.

2. The machine-implemented method of claim 1, wherein adjusting the score includes determining a score increase based on the determined number of the one or more unique query terms.

3. The machine-implemented method of claim 1, wherein adjusting the score includes determining a score penalty based on the determined number of the one or more unique query terms.

4. The machine-implemented method of claim 1, the method further comprising serving, for display on a device to a user, an item of sponsored content selected based on the item of sponsored content's score.

5. The machine-implemented method of claim 4, the method further comprising displaying the served item of sponsored content.

6. A computer program product comprising:
   a computer readable medium; and
   computer program instructions encoded on the computer readable medium that, when processed by a computer, instruct the computer to perform a process, comprising:
      receiving into a memory of a computer system, data representing a plurality of query terms arranged in a plurality of sets of query terms;
      accessing, with the computer system, an electronic database including computer readable storage that stores data representing items of sponsored content, wherein each item of sponsored content has associated a plurality of item terms, and the computer readable storage further stores data representing the plurality of item terms associated with the sponsored content;
      for each of the items of sponsored content:
         identifying a set of matched query terms using a matching operation between the plurality of query terms and the plurality of item terms associated with the item of sponsored content, wherein each of the plurality of sets of query terms comprises at least one query term that matches at least one item term of the plurality of item terms associated with the item of sponsored content;
         formulating a score for the item of sponsored content according to the set of matched query terms, wherein a value for each of the matched query terms is determined based on a number of sets in which the each of the matched query terms resides, weighted based on a set in which the each of the matched query terms resides, and the score of the item is determined by combining values for all the matched query terms;
         identifying, from the identified matched query terms for the item of sponsored content, one or more unique query terms that are included in (i) the identified set of matching query terms and (ii) more than one set of the plurality of sets of query terms;
         determining a number of the one or more unique query terms across sets of the plurality of sets of query terms; and
         adjusting the score for the item of sponsored content as a function of the determined number of the one or more unique query terms; and
      assigning the adjusted score to the item of sponsored content.

7. The computer program product of claim 6, wherein adjusting the score includes determining a score increase based on the determined number of the one or more unique query terms.

8. The computer program product of claim 6, wherein adjusting the score includes determining a score penalty based on the determined number of the one or more unique query terms.

9. The computer program product of claim 6, the process further comprising serving, for display on a device to a user, an item of sponsored content selected based on the item of sponsored content's score.

10. The computer program product of claim 9, the process further comprising displaying the served item of sponsored content.

11. A computer system comprising:
memory; and
a data processing apparatus coupled to the memory, wherein the data processing apparatus comprises:
a matching engine having an input that receives data representing a plurality of query terms arranged in a plurality of sets of query terms, and configured to access an electronic database including computer readable storage that stores data representing items of sponsored content, wherein each item of sponsored content has associated a plurality of item terms, and the computer readable storage further stores data representing the plurality of item terms associated with the sponsored content, and having an output that provides information identifying for each of the items of sponsored content a set of matched query terms using a matching operation between the plurality of query terms and the plurality of item terms associated with the item of sponsored content, wherein each of the plurality of sets of query terms comprises at least one query term that matches at least one item term of the plurality of item terms associated with the item of sponsored content;
a condition detector having an input that receives information describing for each of the items of sponsored content the identified set of matched query terms, and having an output that provides a number of one or more unique terms that are included in (i) the identified set of matched query terms and (ii) more than one set of the plurality of sets of query terms; and
a score calculator having an input that receives the information describing for each of the items of sponsored content the determined number of the one or more unique query terms, and having an output that provides a score for each of the items of sponsored content according to the set of matched query terms, wherein a value for each of the matched query terms is determined based on a number of sets of the plurality of sets of query terms in which the each of the matched query terms resides, weighted based on a set in which the each of the matched query terms resides, and the score of the item is determined by combining values for all the matched query terms, wherein the score for each of the items of sponsored content is adjusted as a function of the determined number of the one or more unique query terms, and the adjusted score is assigned to the item of sponsored content.

12. The computer system of claim 11, wherein the score calculator is configured to adjust the score using a score increase based on the determined number of the one or more unique query terms.

13. The computer system of claim 11, wherein the score calculator is configured to adjust the score using a score penalty based on the determined number of the one or more unique query terms.

14. The computer system of claim 11, further comprising a server for serving, for display on a device to a user, an item of sponsored content selected based on the item of sponsored content's score.

15. The computer system of claim 14, further comprising a device displaying the served item of sponsored content.

16. A computer implemented method for selecting a content item comprising:
providing items of sponsored content, wherein data representing the items of sponsored content is stored in an electronic database including computer readable storage, wherein each of the items of sponsored content has associated a plurality of item terms, and the computer readable storage further stores data representing the plurality of item terms associated with the sponsored content;
receiving a request for sponsored content;
receiving into a memory of a computer system, data representing a plurality of query terms arranged in a plurality of sets of query terms;
accessing, with the computer system, the electronic database that stores the data representing the items of sponsored content;
using one or more processors in the computer system, for each of the items of sponsored content:
identifying a set of matched query terms using a matching operation between the plurality of query terms and the plurality of item terms associated with the item of sponsored content, wherein each of the plurality of sets of query terms comprises at least one query term, wherein each of the at least one query term of the identified set of matching query terms that matches at least one item term of the plurality of item terms associated with the item of sponsored content;
formulating a score for the item of sponsored content according to the set of matched query terms, wherein a value for each of the matched query terms is determined based on a number of sets of the plurality of sets of query terms in which the each of the matched query terms resides, weighted based on a set in which the each of the matched query terms resides, and the score of the item is determined by combining values for all the matched query terms;
identifying, from the identified matched query terms for the item of sponsored content, one or more unique query terms that are included in (i) the identified set of matched query terms and (ii) more than one set of the plurality of sets of query terms;
determining a number of the one or more unique query terms across sets of the plurality of sets of query terms;
adjusting the score for the item of sponsored content as a function of the determined number of the one or more unique query terms;
assigning the adjusted score to the item of sponsored content; and
responding to the request for sponsored content by returning an item of sponsored content selected based on the adjusted score for the item of sponsored content.

17. The computer-implemented method of claim 16, wherein adjusting the score includes determining a score increase as a function of the determined number of the one or more unique query terms.

18. The computer-implemented method of claim 16, wherein adjusting the score includes determining a score penalty as a function of the determined number of the one or more unique query terms.

* * * * *